(12) United States Patent
Yoshida et al.

(10) Patent No.: US 10,000,135 B2
(45) Date of Patent: Jun. 19, 2018

(54) PARKING ASSIST DEVICE

(71) Applicant: NISSAN MOTOR CO., LTD., Yokohama-shi, Kanagawa (JP)

(72) Inventors: Shigeyuki Yoshida, Kanagawa (JP); Masaki Konno, Kanagawa (JP); Yoshitake Fukushima, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days. days.

(21) Appl. No.: 15/025,706

(22) PCT Filed: Sep. 30, 2013

(86) PCT No.: PCT/JP2013/076499
§ 371 (c)(1),
(2) Date: Mar. 29, 2016

(87) PCT Pub. No.: WO2015/045141
PCT Pub. Date: Apr. 2, 2015

(65) Prior Publication Data
US 2016/0243955 A1    Aug. 25, 2016

(51) Int. Cl.
*B62D 15/02* (2006.01)
*B60L 11/18* (2006.01)

(52) U.S. Cl.
CPC ......... *B60L 11/1835* (2013.01); *B60L 11/182* (2013.01); *B60L 11/1803* (2013.01);
(Continued)

(58) Field of Classification Search
CPC ................ B60L 11/1803; B60L 11/182; B60L 11/1824; B60L 11/1835; B60L 11/1861; B60L 2210/30; B60L 2210/40; B60L 2250/10; B60L 2250/16; B60L 2250/24; B60L 2250/26; B62D 15/027;
(Continued)

(56) References Cited

U.S. PATENT DOCUMENTS 2,074,251 A    3/1937   Braun
6,341,430 B1   1/2002   Carstens et al.
(Continued)

FOREIGN PATENT DOCUMENTS

EP    2 184 208 A1    5/2010
EP    2 202 132 A2    6/2010
(Continued)

OTHER PUBLICATIONS

USPTO Office Action, U.S. Appl. No. 15/111,259, dated Jan. 26, 2017, 18 pages.
(Continued)

*Primary Examiner* — Genna M Mott
(74) *Attorney, Agent, or Firm* — Foley & Lardner LLP (57) ABSTRACT

A wireless power supply device includes a marker provided closer to a side where a vehicle enters when parked than a power transmission coil unit housing a power transmission coil. The marker includes at least two segments not parallel to each other, and an end portion of one segment is connected to another segment. The power transmission coil is separated by a predetermined distance from a point of intersection of the two segments in a direction in which the one segment extends.

2 Claims, 8 Drawing Sheets

(52) U.S. Cl.
CPC ....... B60L 11/1824 (2013.01); B60L 11/1861 (2013.01); B62D 15/027 (2013.01); B62D 15/028 (2013.01); B62D 15/0285 (2013.01); B60L 2210/30 (2013.01); B60L 2210/40 (2013.01); B60L 2250/10 (2013.01); B60L 2250/16 (2013.01); B60L 2250/24 (2013.01); B60L 2250/26 (2013.01); Y02T 10/7005 (2013.01); Y02T 10/705 (2013.01); Y02T 10/7044 (2013.01); Y02T 10/7072 (2013.01); Y02T 10/7241 (2013.01); Y02T 90/12 (2013.01); Y02T 90/121 (2013.01); Y02T 90/122 (2013.01); Y02T 90/125 (2013.01); Y02T 90/127 (2013.01); Y02T 90/14 (2013.01)

(58) Field of Classification Search
CPC .............. B62D 15/028; B62D 15/0285; Y02T 10/7005; Y02T 10/7044; Y02T 10/705; Y02T 10/7072; Y02T 10/7241; Y02T 90/12; Y02T 90/121; Y02T 90/122; Y02T 90/125; Y02T 90/127; Y02T 90/14
See application file for complete search history.

(56) References Cited

U.S. PATENT DOCUMENTS

| | | | |
|---|---|---|---|
| 7,940,193 | B2 | 5/2011 | Yamanaka |
| 9,379,572 | B2 | 6/2016 | Ichikawa et al. |
| 2008/0158011 | A1 | 7/2008 | Yamanaka |
| 2010/0066515 | A1 | 3/2010 | Shimazaki et al. |
| 2010/0211267 | A1* | 8/2010 | Shimazaki ............... B60R 1/00 701/42 |
| 2011/0285349 | A1* | 11/2011 | Widmer ................ B60L 11/182 320/108 |
| 2012/0095617 | A1 | 4/2012 | Martin |
| 2012/0235636 | A1* | 9/2012 | Partovi ................... H02J 7/025 320/108 |
| 2013/0037339 | A1 | 2/2013 | Hickox |
| 2013/0335015 | A1 | 12/2013 | Ichikawa et al. |
| 2014/0035565 | A1* | 2/2014 | Enthaler ................. G01B 7/14 324/207.17 |
| 2016/0332572 | A1 | 11/2016 | Gibeau et al. |
| 2016/0332575 | A1* | 11/2016 | Fukushima ......... B60L 11/1803 |

FOREIGN PATENT DOCUMENTS

| | | |
|---|---|---|
| EP | 2 556 984 A1 | 2/2013 |
| JP | 61-193210 A | 8/1986 |
| JP | 2003-182489 A | 7/2003 |
| JP | 2008-162426 A | 7/2008 |
| JP | 2010-195265 A | 9/2010 |
| JP | 2010-234878 A | 10/2010 |
| JP | 2011-015549 A | 1/2011 |
| JP | 2011-182608 A | 9/2011 |
| JP | 2012-206691 A | 10/2012 |
| JP | 2013-046482 A | 3/2013 |
| JP | 2013-192404 A | 9/2013 |
| JP | 2013-258881 A | 12/2013 |
| KR | 10-2009-0096736 A | 9/2006 |
| WO | WO-2010/098397 A1 | 9/2010 |
| WO | WO-2013/146139 A1 | 10/2013 |

OTHER PUBLICATIONS

USPTO Office Action, U.S. Appl. No. 15/111,259, dated May 16, 2017, 16 pages.
USPTO Office Action, U.S. Appl. No. 15/111,259, dated Sep. 8, 2017, 12 pages.
USPTO Notice of Allowance, U.S. Appl. No. 15/111,259, dated Jan. 18, 2018, 12 pages.

* cited by examiner

PARKING ASSIST DEVICE

TECHNICAL FIELD

The present invention relates to a wireless power supply device and a parking assist device.

BACKGROUND ART

There are known wireless power supply devices for charging batteries installed in, for example, electric vehicles via a wireless connection between power receiving coils provided in the vehicles and power transmission coils provided on the ground side. A wireless power supply device can efficiently supply electric power by adjusting a relative position between a power transmission coil and a power receiving coil. In association therewith, there is known a parking assist system equipped with a camera for imaging the rear side of a vehicle and assisting in positioning a power transmission coil and a power receiving coil at the time of parking based on an image obtained by the camera (refer to Patent Literature 1).

CITATION LIST

Patent Literature

Patent Literature 1: Japanese Unexamined Patent Application Publication No. 2011-015549

SUMMARY OF INVENTION

Technical Problem

The system described in Patent Literature 1, however, may fail to obtain the camera image with the power transmission coil (in particular, a casing for housing the power transmission coil) captured therein depending on a direction in which the vehicle is directed. Although conventional vehicles may include an around view monitor (AVM) system for imaging a periphery of a vehicle and displaying an image thus obtained and converted into a bird's-eye view image on a monitor in the vehicle, a displayed range obtained by the AVM system is limited to a region immediately around the vehicle. If the power transmission coil is located slightly far from the vehicle on the rear side, the power transmission coil cannot be displayed in the bird's-eye view image. As a result, the position of the power transmission coil cannot be designated as a target for parking based on the obtained camera image or bird's-eye view image.

The present invention has been made in view of the conventional problem described above. An object of the present invention is to provide a wireless power supply device and a parking assist device capable of designating a target parking position with high accuracy.

A wireless power supply device according to an aspect of the present invention includes a marker provided closer to a side where a vehicle enters when parked than a power transmission coil unit housing a power transmission coil. The marker includes at least two segments not parallel to each other, and an end portion of one segment is connected to another segment. The power transmission coil is separated by a predetermined distance from a point of intersection of the two segments in a direction in which the one segment extends.

DESCRIPTION OF EMBODIMENTS

Hereinafter, an embodiment of the present invention will be explained with reference to the drawings. First, a configuration of a wireless charging system including a wireless power supply device according to the embodiment is explained below with reference to FIG. 1. The wireless charging system 1 according to the embodiment includes a vehicle-side unit installed in a vehicle 200, and a wireless power supply device 100 as a ground-side unit provided on the ground. The wireless charging system 1 supplies electric power via a wireless connection from the wireless power supply device 100 to the vehicle-side unit to charge a battery 28 mounted on the vehicle 200.

Figure 1:
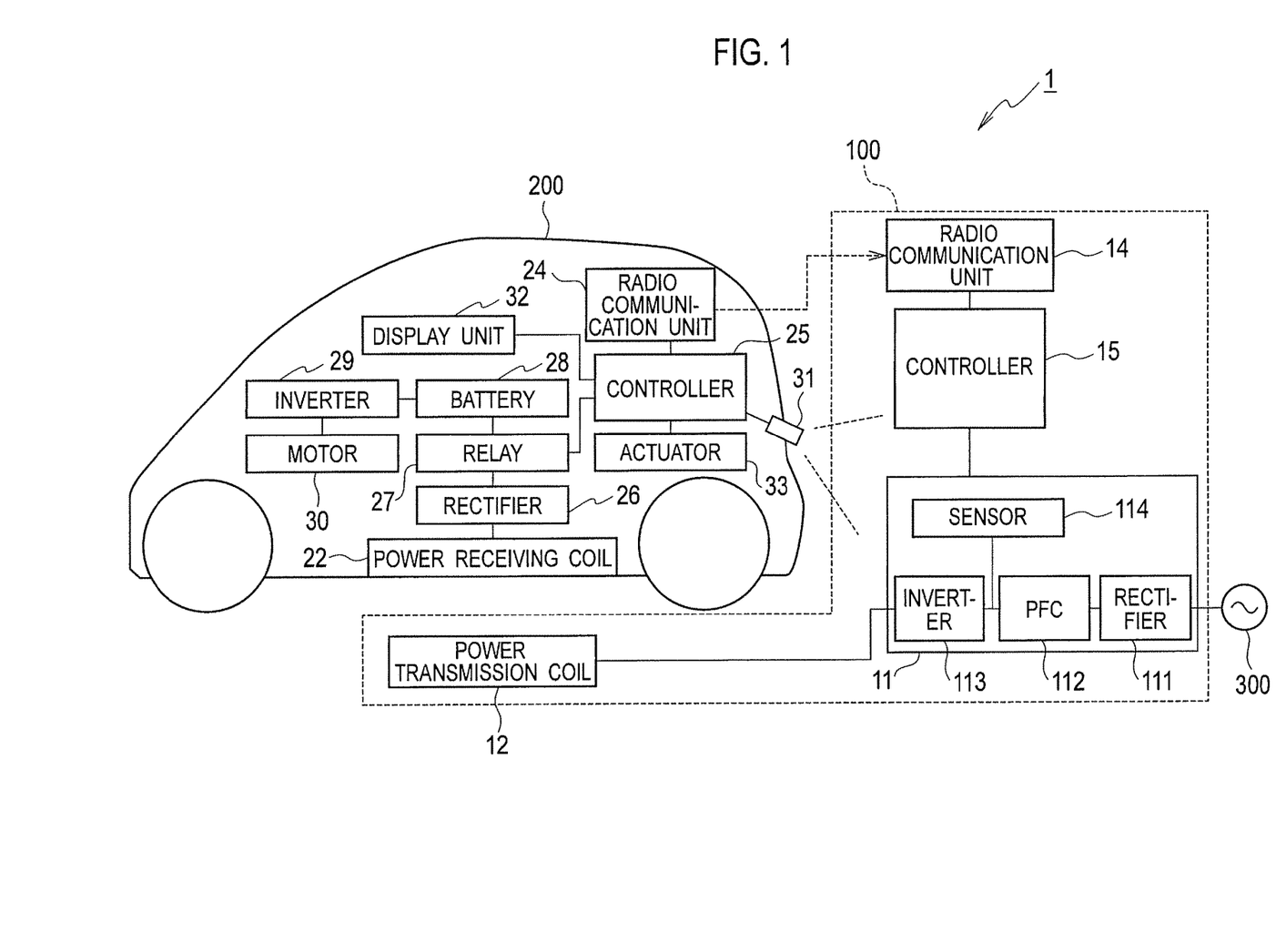
FIG. 1 is a block diagram showing a configuration of a wireless charging system including a wireless power supply device according to the present embodiment.

The wireless power supply device 100 is placed in, for example, a power supply stand or a parking lot. The wireless power supply device 100 supplies electric power via a wireless connection from a power transmission coil 12 to a power receiving coil 22 described below in a state where the vehicle 200 is parked in a predetermined parking position. The wireless power supply device 100 includes a power controller 11, the power transmission coil 12, a radio communication unit 14, and a controller 15.

The power controller 11 converts AC power transmitted from an AC power source 300 into high-frequency AC power and transmits the converted power to the power transmission coil 12. The power controller 11 includes a rectifier 111, a power factor correction (PFC) circuit 112, an inverter 113, and a sensor 114.

The rectifier 111 is electrically connected to the AC power source 300 to rectify the AC power output from the AC power source 300. The PFC circuit 112 improves power factor by rectifying waveforms output from the rectifier 111 and is connected between the rectifier 111 and the inverter 113. The inverter 113 is a power conversion circuit including a PWM control circuit having a smoothing capacitor and a switching device such as an IGBT. The inverter 113 converts DC power output from the PFC circuit 112 into high-frequency AC power and supplies the converted power to the power transmission coil 12 according to a switching control signal from the controller 15. The sensor 114 is connected between the PFC circuit 112 and the inverter 113 to detect current and voltage flowing between the PFC circuit 112 and the inverter 113.

The power transmission coil 12 is used for supplying electric power via a wireless connection to the power receiving coil 22 mounted on the vehicle 200, and is wound on a coil axis in a direction parallel to a road surface in a parking space. The power transmission coil 12 is provided in the parking space. In particular, the power transmission coil 12 is provided in such a manner as to be positioned immediately below and kept at a distance from the power receiving coil 22 when the vehicle 200 is parked in an appropriate parking position in the parking space.

The radio communication unit 14 communicates with a radio communication unit 24 installed in the vehicle 200. A frequency in communication between the radio communication unit 14 and the radio communication unit 24 is higher than that used for peripheral devices for the vehicle such as Intelligent Key (registered trademark). The radio communication unit 14 and the radio communication unit 24 communicate with each other by a means suitable for long-distance communication including various kinds of wireless LANs.

The controller 15 controls the power controller 11 and the radio communication unit 14. The controller 15 transmits a control signal for starting power supply from the wireless power supply device 100 toward the vehicle 200 through the communication between the radio communication 14 and the radio communication 24. The controller 15 receives, from the vehicle 200 side, a request signal for requesting the electric power supplied from the wireless power supply device 100. The controller 15 controls a switching operation of the inverter 113 based on the request signal and current detected by the sensor 114 so as to regulate electric power transmitted from the power transmission coil 12.

The vehicle 200 includes, as the vehicle-side unit, the power receiving coil 22, the radio communication unit 24, a controller 25, a rectifier 26, a relay 27, the battery 28, an inverter 29, and a motor 30. The power receiving coil 22 is used for receiving electric power via a wireless connection from the power transmission coil 12 of the wireless power supply device 100. The power receiving coil 22 is placed on the bottom of the vehicle and, for example, between the rear wheels. The power receiving coil 22 is wound on a coil axis in the direction parallel to the road surface in the parking space in the same manner as the power transmission coil 12. The power receiving coil 22 is provided in such a manner as to be positioned immediately above and kept at a distance from the power transmission coil 12 when the vehicle 200 is parked in an appropriate parking position in the parking space.

The radio communication unit 24 communicates with the radio communication unit 14 of the wireless power supply device 100. The rectifier 26 is a rectifying circuit connected to the power receiving coil 22 to rectify AC power received by the power receiving coil 22 to DC power. The relay 27 includes a relay switch turned on/off based on the control by the controller 25, and functions to disconnect a high-power system including the battery 28 from the power receiving portion 22 and the rectifier 26 serving as a circuit for charging once the relay switch is turned off.

The battery 28 is a power source of the vehicle 200 and configured such that a plurality of secondary batteries are connected to each other. The inverter 29 is a power conversion circuit including a PWM control circuit having a smoothing capacitor and a switching device such as an IGBT. The inverter 29 converts DC power output from the battery 28 into AC power and supplies the converted power to the motor 30 according to a switching control signal from the controller 15. The motor 30 is, for example, a three-phase AC motor serving as a drive power source for driving the vehicle 200.

The controller 25 includes a central processing unit (CPU), a micro-processing unit (MPU) or a microcontroller and controls the charge of the battery 28 and the communication of the radio communication unit 24. The controller 25 transmits a signal for starting charging to the controller 15 of the wireless power supply device 100 through the radio communication unit 24 and the radio communication unit 14. The controller 25 is connected to a controller for controlling the entire vehicle 200 via a CAN network (not shown in the drawing). This controller manages a switching control of the inverter 29 and a state of charge (SOC) of the battery 28. The controller 25 determines whether the battery 28 is fully charged based on the SOC, and transmits a signal for stopping charging to the controller 25 of the wireless power supply device 100 when the battery is fully charged.

The wireless charging system 1 conducts transmission and reception of high-frequency electric power between the power transmission coil 12 and the power receiving coil 22 in a wireless manner through electromagnetic induction. In other words, once a voltage is applied to the power transmission coil 12, a magnetic connection is caused between the power transmission coil 12 and the power receiving coil 22 so as to supply electric power from the power transmission coil 12 to the power receiving coil 22.

The vehicle 200 is equipped with a camera 31 and a display unit 32. The camera 31 includes a plurality of cameras for imaging the rear side, the front side and both right and left sides of the vehicle 200 to obtain camera images. The controller 25 converts each camera image imaged by the camera 31 into a bird's-eye view image (an example of a viewpoint converted image) as viewed from above the camera 31. The controller 25 forms a bird's-eye view image (an around view image) showing the periphery of the vehicle 200 in such a manner as to join a plurality of bird's-eye view images together and transmits the bird's-eye view image showing the periphery of the vehicle to the display unit 32. The display unit 32 is a display located in a position where a driver can look and displays the bird's-eye view image showing the periphery of the vehicle to the driver.

The vehicle 200 is equipped with an actuator 33 for controlling a driving operation of the vehicle 200. In particular, the actuator 33 includes a steering actuator for steering the front wheels of the vehicle 200 and a braking actuator for operating a brake to brake the vehicle 200. The operation of the actuator 33 is controlled by the controller 25.

An example of an external configuration of the wireless power supply device 100 is explained below with reference to FIG. 2. The wireless power supply device 100 includes a power supply device body 101, a power transmission coil unit 102, and a marker M. The power supply device body 101 is a casing housing at least the power controller 11, the radio communication unit 14 and the controller 15 shown in FIG. 1. The power transmission coil unit 102 is a casing housing at least the power transmission coil 12 shown in FIG. 1. The power transmission coil unit 102 is located in the parking space defined by parking frames S. In the example shown in FIG. 2, the power transmission coil unit 102 is located between wheel chocks 51. The relative position between the power transmission coil unit 102 and the power receiving coil 22 can be adjusted in such a manner as to park the vehicle 200 in a state where the rear wheels of the vehicle 200 is in contact with the wheel chocks 51. The vehicle 200 is moved to and parked in the parking space in a manner such that the power receiving coil 22 is positioned above the power transmission coil unit 102 with the assistance of a parking assist device according to the embodiment. The marker M is provided on the road surface in the parking space.

Figure 2:
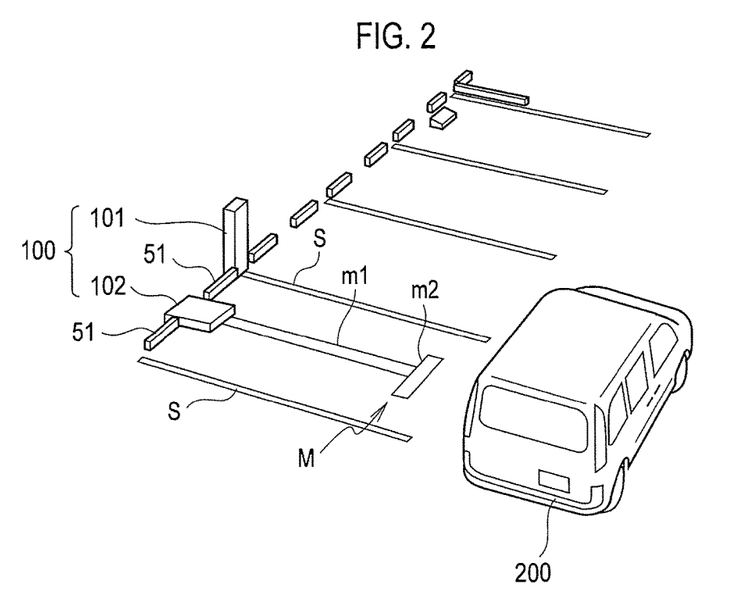
FIG. 2 is a view showing an example of an installation state of the wireless power supply device 100 according to the present embodiment.
Figure 3:
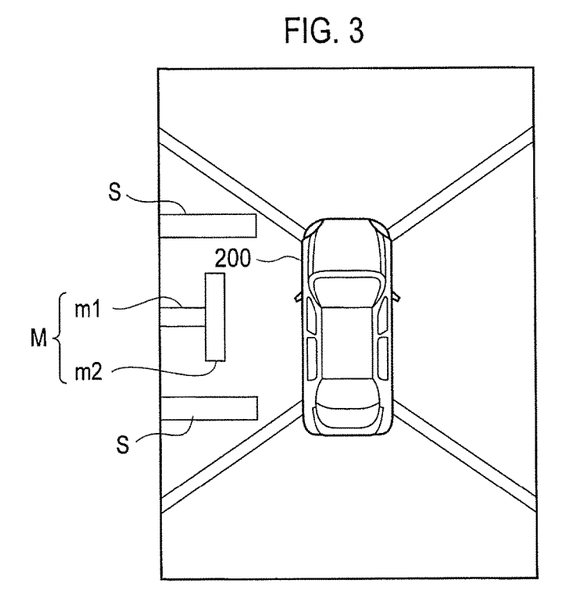
FIG. 3 is a schematic view showing an example of a bird's-eye view image displayed on a display unit 32 installed in a vehicle 200 shown in FIG. 2.

The bird's-eye view image showing the periphery of the vehicle 200 as shown in FIG. 3 is displayed on the display unit 32 installed in the vehicle 200 shown in FIG. 2. Since a displayed range of an around view monitor (AVM) is limited to a region adjacent to the periphery of the vehicle 200, part of the marker M (including at least a point of intersection between one segment m1 and another segment m2) is displayed on the display unit 32. The power transmission coil unit 102 is not displayed on the display unit 32. It is thus difficult to confirm a target parking position (the power transmission coil unit 102) directly via the display unit 32.

Figure 4:
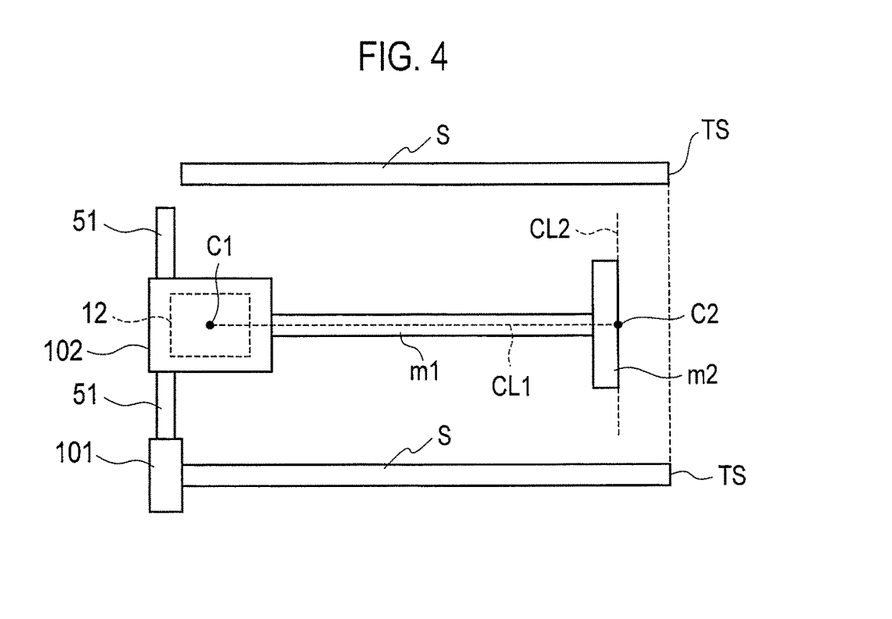
FIG. 4 is a top view as viewed from above the wireless power supply device 100 shown in FIG. 2.

FIG. 4 is a top view as viewed from above the wireless power supply device 100 shown in FIG. 2. The marker M is located on the side where the vehicle 200 enters when parked and on the opposite side of the power transmission coil unit 102. The marker M is composed of, for example, a luminous body such as an LED, a mark drawn on a road surface, or a three-dimensional object. Here, the three-dimensional object should, of course, have a height so as to be placed below the vehicle 200. The marker M is provided "on the opposite side of the power transmission coil unit 102" so as to indicate the presence of the power transmission coil unit 102. Therefore, the marker M is not provided in a parking space in which the wireless power supply device 100 is not provided.

The marker M includes at least two segments (m1, m2) not parallel to each other and has a configuration in which one end of the one segment m1 is connected to the other segment m2. Here, "one segment m1 being connected to the other segment m2" includes, as described below, a case where the one end of the one segment m1 is spaced apart from the other segment m2 by a distance capable of designating a point of intersection C2 between the one segment m1 and the other segment m2 by image processing. For example, the one end of the one segment m1 may be separated slightly from the other segment m2 when viewed at close range even though these are seemingly in contact with each other when viewed from a distance. The power transmission coil unit 102 is separated by a predetermined distance from the point of intersection C2 of the two segments (m1, m2) in a direction in which the one segment m1 extends.

In the example shown in FIG. 4, the one segment m1 extends from the circumference of the power transmission coil unit 102 toward the side where the vehicle 200 enters when parked, and one end of the one segment m1 is connected to the other segment m2. In other words, the one segment m1 connects the power transmission coil unit 102 and the other segment m2. The other segment m2 is orthogonal to the longitudinal direction of the parking space. The longitudinal direction of the parking space is parallel to a direction in which the vehicle 200 enters when parked and also parallel to the parking frames S shown in FIG. 4. Namely, the one segment m1 is at a right angle to the other segment m2.

The one segment m1 is longer than the other segment m2. The one end of the one segment m1 is connected to the middle point of the other segment m2. Further, the straight line CL1 continued and extending from the one segment m1 passes through the middle C1 of the power transmission coil 12. Here, "the middle C1 of the power transmission coil 12" is a center between outermost ends of a portion in the power transmission coil 12 on which Litz wire is wound. The end of the one segment m1 connected to the other segment m2 is closer to the power transmission coil 12 than end portions of the parking frames S.

The marker M is used to designate the point of intersection C2 between the one segment m1 and the other segment m2 and the direction (vector) CL1 in which the one segment m1 extends. Thus, the position of the power transmission coil unit 102 separated from the point of intersection C2 by a predetermined distance in the vector CL1 can be designated with high accuracy.

Figure 5:
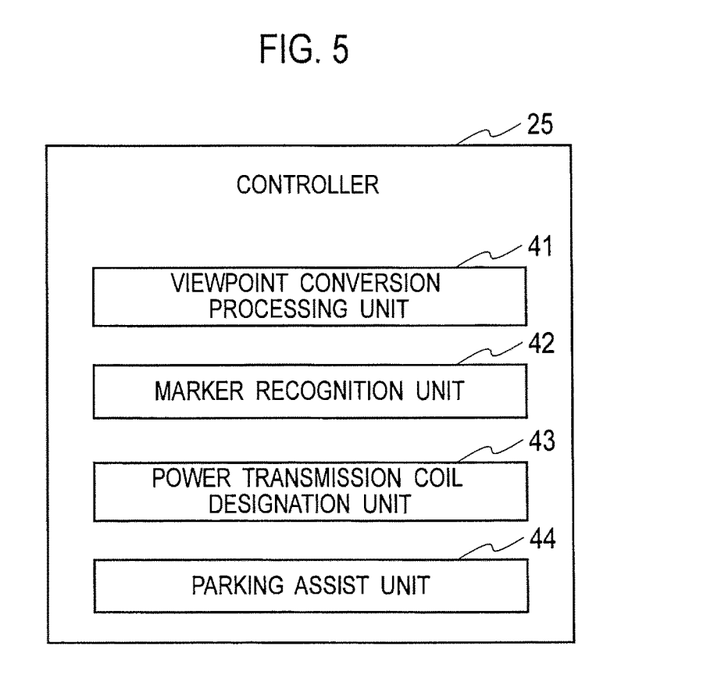
FIG. 5 is a block diagram showing a functional configuration of a controller 25 included in a parking assist device according to the embodiment.

Next, the parking assist device for assisting in parking the vehicle 200 by designating the position of the power transmission coil unit 102 based on the marker M is explained below. The parking assist device includes the camera 31, the controller 25 and the actuator 33 installed in the vehicle 200. The controller 25 executes information processing in accordance with a computer program in which a process for assisting in parking the vehicle 200 is recorded. A specific information processing function executed by the controller 25 is explained below. As shown in FIG. 5, the controller 25 functions as a viewpoint conversion processing unit 41, a marker recognition unit 42, a power transmission coil designation unit 43, and a parking assist unit 44.

The viewpoint conversion processing unit 41 converts a camera image obtained by the camera 31 into a bird's-eye view image as viewed from above the camera 31. In the embodiment, the controller 25 forms and displays a bird's-eye view image around the vehicle 200 as shown in FIG. 3 in such a manner as to join a plurality of bird's-eye view images together. The viewpoint conversion processing unit 41 is only required to convert at least a camera image in which the marker M is imaged, among the plurality of bird's-eye view images, into a bird's-eye view image.

Figure 6:
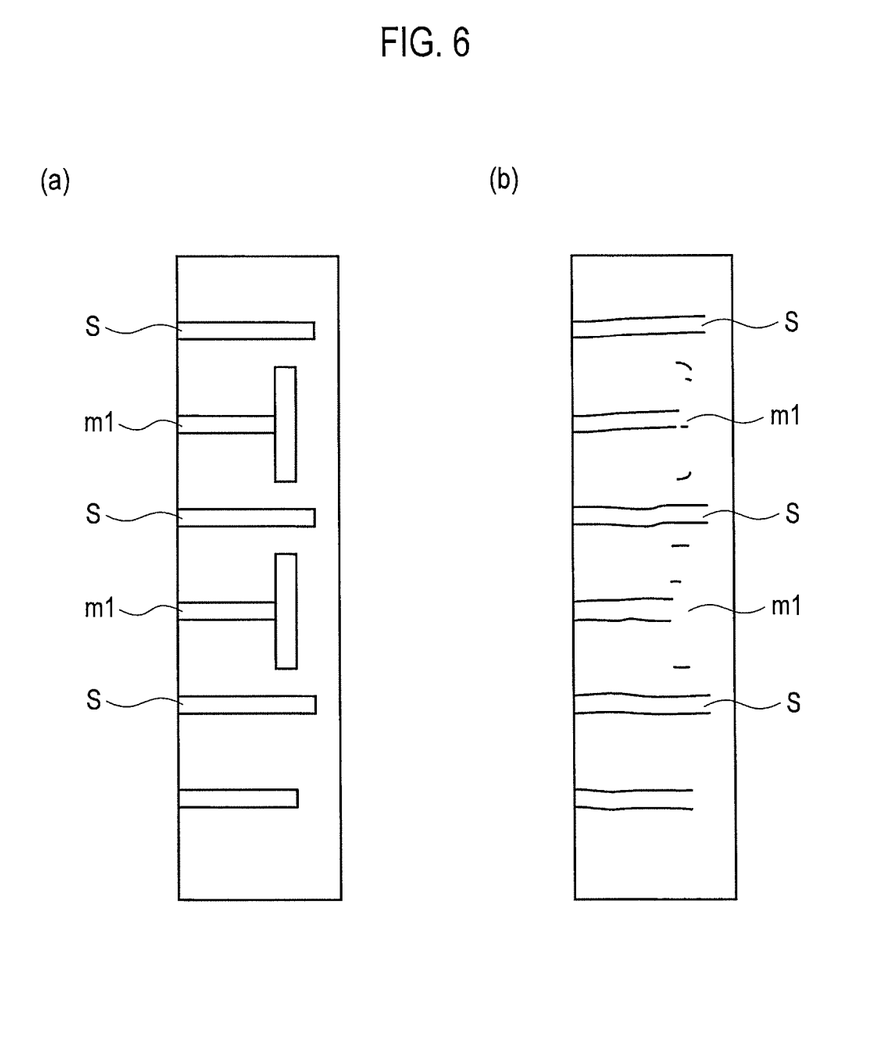
FIG. 6(a) is a view showing a bird's-eye view image generated by a viewpoint conversion processing unit 41 and displayed in two colors.
FIG. 6(b) is a view showing an edge image extracted when the image of FIG. 6(a) is scanned in a vertical direction (in a direction perpendicular to parking frame S).
Figure 7:
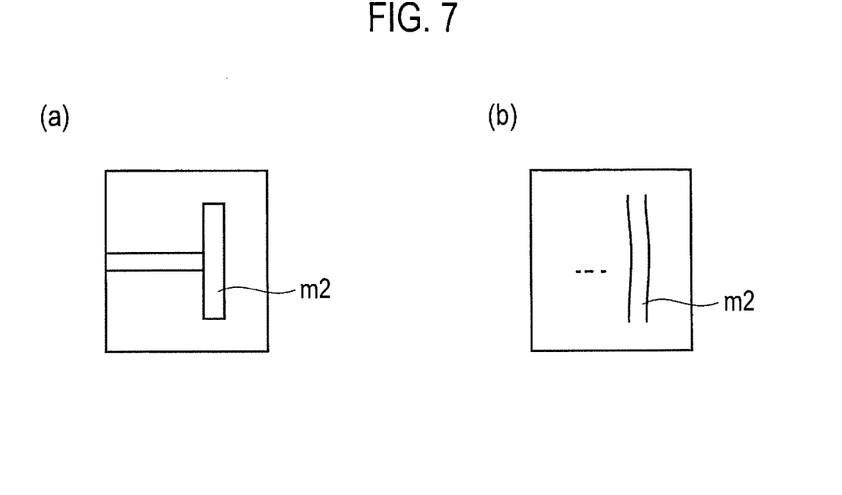
FIG. 7(a) is a view showing a bird's-eye view image generated by the viewpoint conversion processing unit 41 and displayed in two colors.
FIG. 7(b) is a view showing an edge image extracted when the image of FIG. 7(a) is scanned in a lateral direction (in a direction parallel to parking frame S).

The marker recognition unit 42 designates the point of intersection C2 of the two segments (m1, m2) and the direction CL1 in which the one segment m1 extends from the point of intersection C2 by referring to the bird's-eye view image generated by the viewpoint conversion processing unit 41. A specific processing operation of the marker recognition unit 42 will be explained below with reference to FIG. 6 to FIG. 8.

Figure 9:
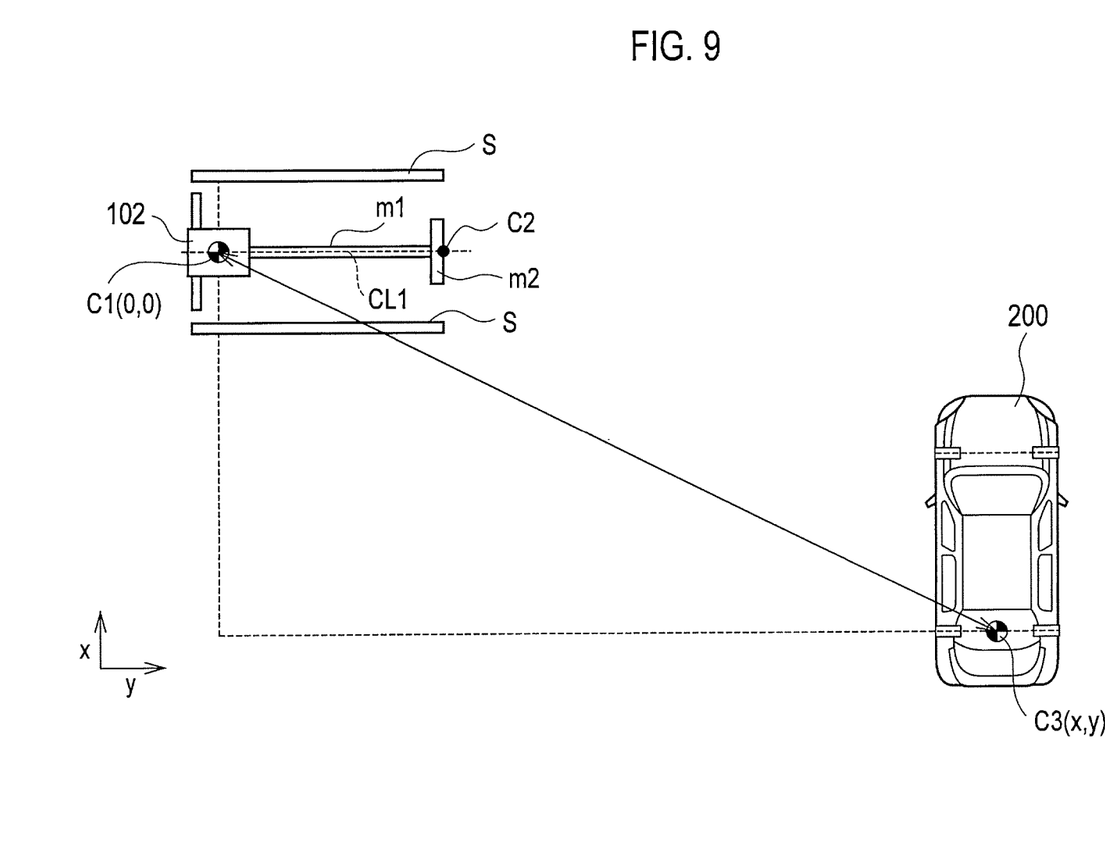
FIG. 9 is a schematic view showing a display example of a position of a power transmission coil unit 102 (a power transmission coil 12) designated by a power transmission coil designation unit 43.

The power transmission coil designation unit 43 uses the point of intersection C2 and the direction CL1 designated by the marker recognition unit 42 to designate the position of the power transmission coil unit 102 (the power transmission coil 12) separated from the point of intersection C2 by a predetermined distance in the direction CL1. For example, as shown in FIG. 9, the power transmission coil designation unit 43 computes coordinates (x, y) of the middle C3 of the power receiving coil 22 when the middle C1 of the power transmission coil 12 is the origin. The coordinate system shown in FIG. 9 includes a y axis in the width direction of the vehicle 200 and an x axis in the traveling direction of the vehicle 200.

The parking assist unit 44 calculates a track along which the vehicle 200 moves from a current position to a target for parking (the power transmission coil unit 102) based on the position of the power transmission coil unit 102 designated by the power transmission coil designation unit 43. The track includes a combination of an arc line, a straight line and a clothoid curve, and may be calculate by conventional means.

The parking assist unit 44 also controls the actuator 33 and the motor 30 in order to autonomously drive the vehicle 200 along the calculated track. The actuator 33 operates the brake of the vehicle 200 and steers the front wheels of the vehicle 200 based on the control by the parking assist unit 44. The parking assist unit 44 informs the driver of a shift to autonomous driving with voice or indication on the display unit 32.

Note that the parking assist unit 44 is not limited to the example of the autonomous driving. The parking assist unit 44 may, for example, inform the driver of a forward movement, a rearward movement, a stop, and an operation of a steering wheel with voice or indication on the display unit 32 in order that the driver can independently move the vehicle 200 along the calculated track. In such a case, the driver may operate an accelerator pedal, a brake pedal, a shift lever or the steering wheel so as to move the vehicle 200 along the track toward the target for parking (the power transmission coil unit 102).

The parking assist unit 44 may generate a bird's-eye view image shown in FIG. 9 and display the image on the display unit 32 during either autonomous driving or driving by the driver. The driver can recognize that the vehicle 200 is moving along the track toward the target for parking (the power transmission coil unit 102) in a manner such that the current position of the vehicle 200 is updated consecutively.

Next, the processing of recognizing the marker M by the marker recognition unit 42 is explained below. FIG. 6(a) and FIG. 7(a) are bird's-eye view images generated by the viewpoint conversion processing unit 41 and indicated in two colors, and FIG. 6(b) and FIG. 7(b) are edge images extracted from the image of FIG. 6(a). FIG. 6(b) is an image obtained in such a manner as to plot edges extracted when pixels are scanned in the vertical direction (in the direction perpendicular to the parking frames S). FIG. 7(b) is an image obtained in such a manner as to plot edges extracted when pixels are scanned in the lateral direction (in the direction parallel to the parking frames S).

Figure 8:
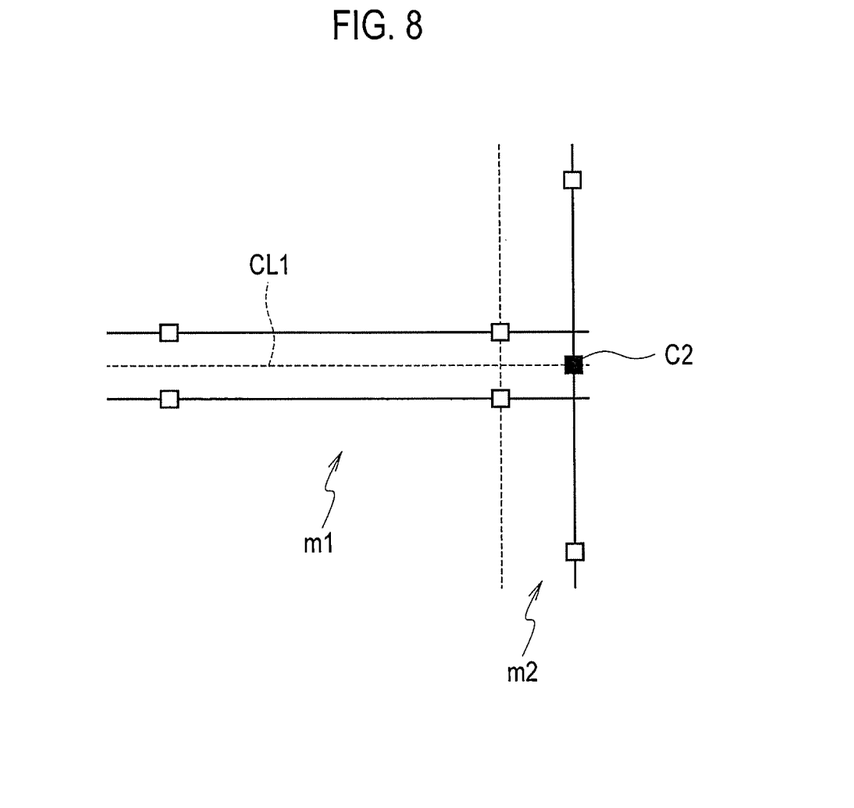
FIG. 8 is a schematic view showing a direction CL1 and an intersection C2 designated based on the edge images of FIG. 6(b) and FIG. 7(b).

As shown in FIG. 6(b), the edges of the segments m1 of the markers M and the parking frames S are extracted. The direction in which the segments m1 extend can be designated with high accuracy based on FIG. 6(b); however, it is difficult to designate the position of one end of each segment m1 accurately based on FIG. 6(b). As shown in FIG. 7(b), an edge of the other segment m2 is extracted. Accordingly, as shown in FIG. 8, the marker recognition unit 42 can designate the direction CL1 in which the one segment m1 extends with high accuracy based on the edge image of FIG. 6(b). At the same time, the marker recognition unit 42 can designate the point of intersection C2 between the one segment m1 and the other segment m2 with high accuracy by further referring to the edge image of FIG. 7(b).

The end of the one segment m1 connected to the other segment m2 is located closer to the power transmission coil 12 than the end portions of the parking frames S. Therefore, it can easily be recognized from the edge image of FIG. 6(b) that the longer edges are the parking frames S, and the shorter edges are the segments m1. However, the method of recognizing the segments m1 is not limited thereto. For example, among the edges shown in FIG. 6(b), the edge connected to the edge of the other segment m2 as shown in FIG. 7(b) may be used for determining the one segment m1.

Here, as a comparative example, a case where the marker M only includes one segment m1 is compared with the embodiment. It is difficult to designate the position of one end of the one segment m1 accurately from an image obtained in such a manner as to plot edges extracted when pixels are scanned in the lateral direction (in the direction parallel to the parking frames S) (corresponding to the image of FIG. 7(b)). The reason for this is that the width of the segment m1 is less than the length of the segment m1 and accordingly, an edge extracted is shortened. In view of this, the marker M according to the embodiment includes the one segment m1 and the other segment m2 not parallel to each other, so as to designate the point of intersection between the one segment m1 and the other segment m2 with high accuracy.

As described above, the embodiment of the present invention can achieve the following effects.

The marker M is located on the side where the vehicle 200 enters when parked opposite to the power transmission coil unit 102. The marker M includes at least two segments (m1, m2) not parallel to each other and has a configuration in which one end of the one segment m1 is connected to the other segment m2. The power transmission coil 12 is located and separated by a predetermined distance from the point of intersection C2 of the two segments (m1, m2) in the direction CL1 in which the one segment m1 extends. Therefore, the marker recognition unit 42 can designate the point of intersection C2 of the two segments (m1, m2) and the direction CL1 in which the one segment m1 extends from the point of intersection C2 with high accuracy by referring to the bird's-eye view image generated by the viewpoint conversion processing unit 41. Accordingly, the power transmission coil designation unit 43 can designate the position of the power transmission coil unit 102 (the power transmission coil 12) with high accuracy based on the point of intersection C2 and the direction CL1.

As a comparative example, a case where part of the one segment m1 other than the one end thereof intersects with the other segment m2 is compared with the present embodiment. In such a case, the direction CL1 in which the one segment m1 extends branches into two opposite directions from the point of intersection C2 between the one segment m1 and the other segment m2. As a result, the direction CL1 toward the target for parking from the point of intersection C2 is hardly distinguished from the opposite one. However, the present embodiment can easily designate the direction CL1 in which the one segment m1 extends since the one end of the one segment m1 is connected to the other segment m2.

When the marker M is a mark drawn on a road surface, part of the segments (m1, m2) disappears due to deterioration of the marker M with the passage of time. Here, as a comparative example, a case where the marker M only includes one segment m1 is compared with the present embodiment. In such a case, one end of the segment m1 is substituted for the point of intersection C2 according to the embodiment. If the one end of the segment m1 disappears due to deterioration with the passage of time, the position of the one end of the segment m1 changes. As another comparative example, a case where a circular marker instead of the other segment m2 is connected to the one end of the one segment m1 is compared with the present embodiment. In such a case, the center of the circular marker is substituted for the point of intersection C2 according to the embodiment. If part of the circular marker disappears due to deterioration with the passage of time, the central position of the circular marker changes. According to the present embodiment, as compared with these comparative examples, the one end of the one segment m1 is connected to the other segment m2. Even when part of the one segment m1 or the other segment m2 disappears due to deterioration with the passage of time, the point of intersection C2 between the one segment m1 and the other segment m2 does not change easily. Accordingly, the position of the power transmission coil unit 102 (the power transmission coil 12) can be designated with high accuracy since the point of intersection C2 and the direction CL1 do not easily change even when part of the marker M disappears due to deterioration with the passage of time.

Even under a condition where image recognition of the marker M by the camera 31 is difficult during the night or due to rainy weather, the marker M in which the one end of the one segment m1 is connected to the other segment m2 is superior to the markers of the comparative examples described above in designating a "point (the point of intersection C2)" and a "direction (the direction CL1 in which the one segment m1 extends)".

The one segment m1 is at a right angle to the other segment m2. Thus, the point of intersection C2 between the one segment m1 and the other segment m2 can be designated easily and accurately. The angle formed by the one segment m1 with the other segment m2 is not easily crushed by the edge extraction processing.

The straight line CL1 continued and extending from the one segment m1 passes through the middle C1 of the power transmission coil 12. This facilitates the positioning of the power receiving coil 22 in the middle C1 of the power transmission coil 12. Accordingly, the vehicle 200 can be parked in such a manner as to increase the power transmission efficiency.

The one segment m1 is longer than the other segment m2, and the one end of the one segment m1 is connected to the middle point of the other segment m2. The connection relationship between the one segment m1 and the other segment m2 facilitates the distinction between the parking frames S and the one segment m1.

The end of the one segment m1 connected to the other segment m2 is located closer to the power transmission coil than the end portions of the parking frames S. This facilitates the distinction between the one segment m1 and the parking frames S in the processing of recognizing the marker M.

The shape of the marker M in the camera image may change depending on the position of the vehicle 200. As a result, the point of intersection C2 and the direction CL1 in which the one segment m1 extends from the point of intersection C2 may not be designated accurately in the processing of recognizing the marker M. In order to deal therewith, the point of intersection C2 between the two segments (m1, m2) and the direction CL1 in which the one segment m1 extends from the point of intersection C2 are designated based on the viewpoint converted image obtained in such a manner as to convert the viewpoint of the camera image into a position above the camera 31. Due to the viewpoint converted image as viewed from above the camera 31, the point of intersection C2 and the direction CL1 can be designated stably and accurately regardless of the position where the camera image is obtained.

Since the marker M is provided on the side where the vehicle 200 enters when parked, the vehicle 200 can be moved toward the power transmission coil unit 102 in such a manner as to refer to the marker M as a guide to the power transmission coil unit 102 even when, for example, the power transmission coil unit 102 is not shown in the bird's-eye view image.

When the marker M is composed of a luminous body such as an LED, the power transmission coil unit 102 itself is hard to be recognized visually during the night or rain, which makes it difficult to recognize the target for parking. The emission of light of the marker M according to the present embodiment facilitates the designation of the position of the power transmission coil unit 102.

Since a parking lot frequently accommodates a large number of vehicles being parked, the recognition of the target for parking tends to be difficult because the power transmission coil unit 102 may be hidden by other vehicles even when visibility is good. According to the present embodiment, however, the marker M is located on the side where the vehicle 200 enters when parked on the opposite side of the power transmission coil unit 102. Therefore, the marker M may be recognized without hidden by other vehicles. Accordingly, the target parking position can easily be designated via the marker M.

First Modified Example

Figure 10:
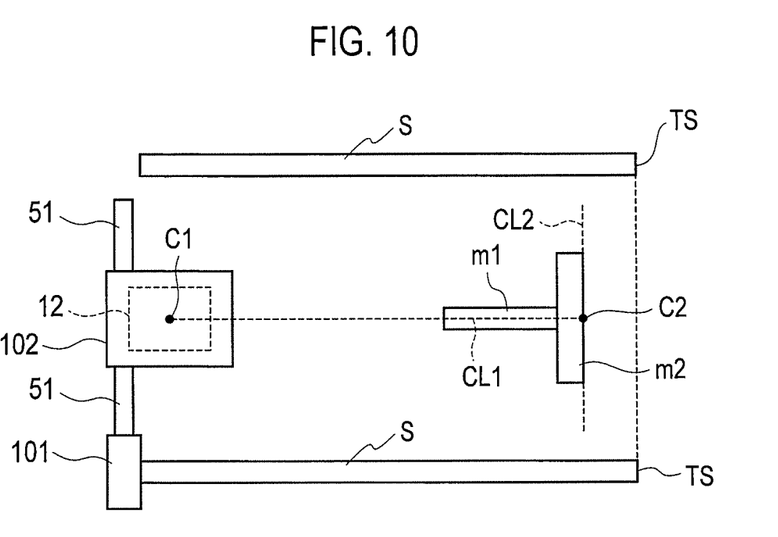
FIG. 10 is a top view showing a shape of marker M according to a first modified example.

Although the one segment m1 shown in FIG. 4 is connected to the power transmission coil unit 102, the one segment m1 is not required to be connected to the power transmission coil unit 102, as shown in FIG. 10. With the marker M having the shape shown in FIG. 10, the point of intersection C2 and the direction CL1 in which the one segment m1 extends can also be designated with high accuracy in the same manner as the marker M shown in FIG. 4.

Second Modified Example

Figure 11:
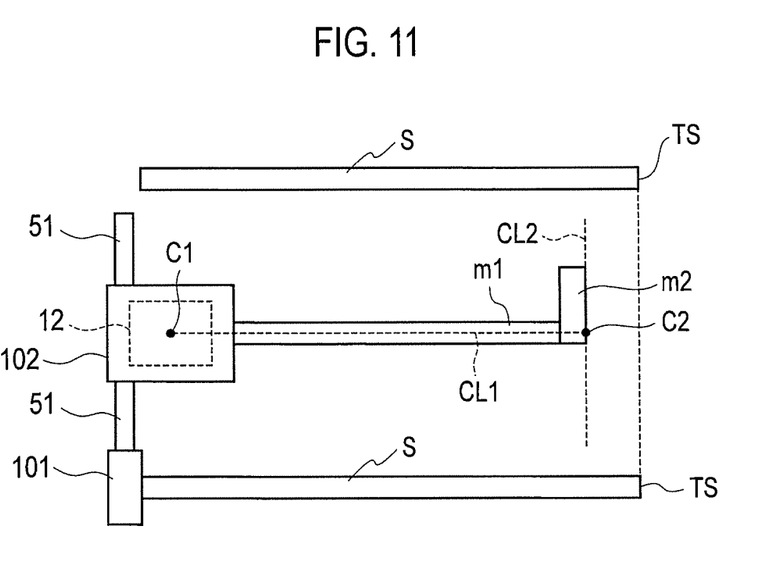
FIG. 11 is a top view showing a shape of marker M according to a second modified example.

Although the one end of the one segment m1 is connected to the middle point of the other segment m2, the one end of the one segment m1 may be connected to one end of the other segment m2 as shown in FIG. 11. With the marker M having the shape shown in FIG. 11, the point of intersection C2 between the one segment m1 and the other segment m2 can also be designated with high accuracy in the same manner as the marker M shown in FIG. 4.

Third Modified Example

Figure 12:
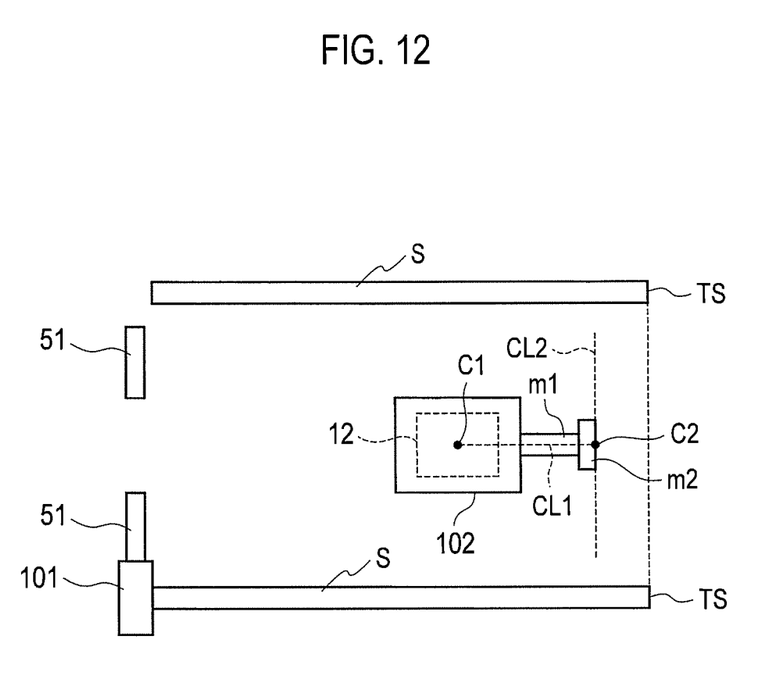
FIG. 12 is a view showing an installation state of the wireless power supply device 100 according to a third modified example.

The wireless power supply device 100 shown in FIG. 2 and FIG. 4 is provided with the power transmission coil unit 102 between the wheel chocks 51. This configuration is suited to the vehicle-side unit in which the power receiving coil 22 is placed between the rear wheels of the vehicle 200. The wireless power supply device 100 according to the embodiment can also be applied to a case of a vehicle-side unit in which the power receiving coil 22 is placed on the front side of the rear wheels of the vehicle 200. For example, as shown in FIG. 12, even when the power transmission coil unit 102 is located close to the side where the vehicle 200 enters when parked in the parking space, the marker M can still be positioned closer to the side where the vehicle 200 enters when parked than the power transmission coil unit 102.

Although the present invention has been described above by reference to the examples, the present invention is not limited to the descriptions thereof, and it will be apparent to those skilled in the art that various modifications and improvements can be made.

Although the embodiment described above designates the point of intersection C2 between the two segments (m1, m2) and the direction CL1 in which the one segment m1 extends from the point of intersection C2 based on the viewpoint converted image, the point of intersection C2 and the direction CL1 may also be designated based on the camera image before the viewpoint conversion is made.

Although the embodiment has exemplified the case where the one segment m1 is at a right angle to the other segment m2, the angle formed by the one segment m1 with the other segment m2 may be other angles other than the right angle.

Although the embodiment has exemplified the case where the marker M is composed of the one segment m1 and the other segment m2, the marker M may further include a third segment or a marker having a different shape.

The present embodiment employs the marker M composed of a visually-recognized object with the unaided eye but is not limited thereto, and the marker M may be an object not visually recognized with the unaided eye but visually recognized through a camera image or a bird's-eye view image.

INDUSTRIAL APPLICABILITY

The wireless power supply device and the parking assist device according to the embodiment of the present invention can accurately designate the position of the power transmission coil unit as a target for parking by recognizing the point of intersection C2 between the two segments (m1, m2) and the direction CL1 in which the one segment m1 extends from the point of intersection C2. The wireless power supply device and the parking assist device according to the embodiment of the present invention are therefore industrially applicable.

REFERENCE SIGNS LIST

100 WIRELESS POWER SUPPLY DEVICE
102 POWER TRANSMISSION COIL UNIT
12 POWER TRANSMISSION COIL
200 VEHICLE
22 POWER RECEIVING COIL
25 CONTROLLER
31 CAMERA
32 DISPLAY UNIT
41 VIEWPOINT CONVERSION PROCESSING UNIT
42 MARKER RECOGNITION UNIT
43 POWER TRANSMISSION COIL DESIGNATION UNIT
44 PARKING ASSIST UNIT
C1 MIDDLE OF POWER TRANSMISSION COIL
C2 POINT OF INTERSECTION BETWEEN ONE SEGMENT AND OTHER SEGMENT
CL1 DIRECTION IN WHICH ONE SEGMENT EXTEND FROM POINT OF INTERSECTION C2
M MARKER
S PARKING FRAME

The invention claimed is:

1. A parking assist device used when transmitting electric power from a power transmission coil provided on a ground to a power receiving coil provided in a vehicle via a wireless connection,
wherein a marker is provided closer to a side where the vehicle enters when parking than the power transmission coil is, the marker including at least two segments not parallel to each other and having a configuration in which an end portion of a first segment is connected to a second segment,
the parking assist device comprising:
a camera configured to image the marker to obtain a camera image;
a marker recognition circuit configured to designate a point of intersection of the first and second segments and a direction in which the first segment extends from the point of intersection based on the camera image; and
a power transmission coil designation circuit configured to designate a position of the power transmission coil separated by a predetermined distance from the point of intersection in the direction in which the first segment extends,
the power transmission coil designation circuit is further configured to:
extract, based on the camera image, two linear edges from the first segment and designate, based on the extracted two linear edges, the direction in which the first segment extends, and
extend other two linear edges from the second segment and designate the point of intersection of the first and second segments based on said extracted other two linear edges and the direction in which the first segment extends.

2. The parking assist device according to claim 1, further comprising a viewpoint conversion processing circuit configured to convert a viewpoint of the camera image into a position above the camera to generate a viewpoint converted image,
wherein the marker recognition circuit is configured to designate the point of intersection of the first and second segments and the direction in which the first segment extends from the point of intersection based on the viewpoint converted image generated by the viewpoint conversion processing circuit.

* * * * *